Sept. 2, 1958 H. FLEISHER 2,850,647
"EXCLUSIVE OR" LOGICAL CIRCUITS
Filed Dec. 29, 1954
FIG. 1
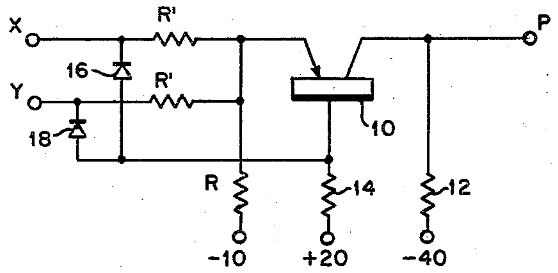
FIG. 2
| INPUT X | INPUT Y | OUTPUT |
|---|---|---|
| 0 | 0 | 0 |
| + | 0 | + |
| 0 | + | + |
| + | + | 0 |
FIG. 4
| INPUT X | INPUT Y | OUTPUT |
|---|---|---|
| 0 | 0 | 0 |
| + | 0 | − |
| 0 | + | − |
| + | + | 0 |
FIG. 3
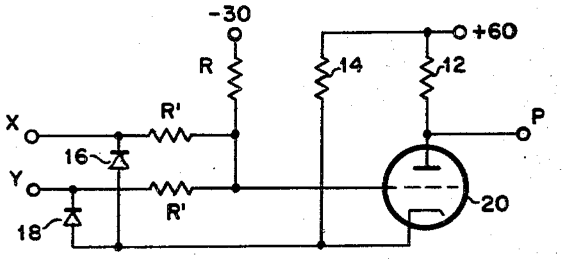
FIG. 5
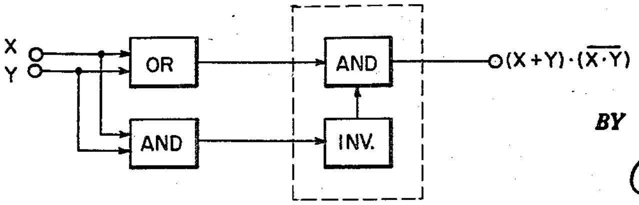
INVENTOR.
HAROLD FLEISHER
BY Joseph C. Sweet, Jr.
ATTORNEY

United States Patent Office 2,850,647
Patented Sept. 2, 1958

2,850,647

"EXCLUSIVE OR" LOGICAL CIRCUITS

Harold Fleisher, Poughkeepsie, N. Y., assignor to International Business Machines Corporation, New York, N. Y., a corporation of New York Application December 29, 1954, Serial No. 478,271

10 Claims. (Cl. 307—88.5)

This invention relates to logical circuits and more particularly to electronic logical circuits of the "Exclusive Or" type.

With the advent of large-scale computers, electronic logical circuits have become increasingly important. One of the types of logical circuits is called the "Exclusive Or" or anti-coincidence circuit. Such a circuit has two inputs and produces an output when a voltage is applied to either, but not both, of these inputs. Prior art circuits of this type have involved the use of numerous components including, for example, a plurality of delay circuits, gate circuits, and inversion devices (see Figure 4 of United States Patent No. 2,636,133 granted April 21, 1953, to Luther W. Hussey, covering a pulse-type circuit).

Accordingly, a primary object of the present invention is to provide a simple, inexpensive electronic logical circuit of the "Exclusive Or" type involving a minimum of components.

Another object of this invention is to provide such a circuit which is direct-coupled to the inputs, and which carries out the function $(x+y)\cdot(\overline{x\cdot y})$ as written in symbolic logic form.

Another object of this invention is to provide such a circuit utilizing a single active electronic translating device.

Another object of this invention is to provide such a circuit utilizing a single transistor.

Still another object of this invention is to provide such a circuit utilizing a single triode vacuum tube.

Other objects of the invention will be pointed out in the following description and claims and illustrated in the accompanying drawings, which disclose, by way of examples, the principle of the invention and the best mode which has been contemplated of applying that principle.

In the drawings:

Figs. 1 and 3 are circuit diagrams of two embodiments of the present invention,

Figs. 2 and 4 are tables showing the output and its polarity for various inputs supplied to the circuits of Figs. 1 and 3, respectively, and Fig. 5 is a block diagram of the two circuits.

Referring now to Fig. 1, a transistor 10, which may be a point-contact type having an n-type semiconductor body, has its collector connected to output terminal P and, through load resistor 12, to a −40 volt source of potential. Its base is connected through resistor 14 to a +20 volt source of potential, and its emitter is connected through a resistor R to a −10 volt source of potential. The emitter is also coupled through respective resistors R′ to input terminals X and Y. The ohmic values of resistors R and R′ are preferably approximately equal, although in some cases it may be desirable to have the value of resistor R different. It will be assumed here that they are equal.

The base is also coupled to inputs X and Y through semiconductor diodes 16 and 18, respectively, poled as shown to pass current from the base to inputs X and Y. Assuming that inputs X and Y are normally at ground potential, i. e., 0 volt, and that positive voltages each of 20 volts magnitude are applied to these inputs individually, Fig. 2 shows the resultant output at terminal P for various input combinations. Note that when no voltage is applied to either input X or Y, or when positive voltages are applied to these inputs simultaneously, there is no output; but that when a positive voltage is applied individually to either input X or to input Y, but not to both, a positive output is produced at terminal P.

By simple network analysis (assuming for the moment that no emitter current flows), it can be shown that the emitter potential, when no inputs are applied, is at −3⅓ volts, whereas when a positive input of 20 volts is applied to either input X or to input Y, the emitter is at +3⅓ volts, and when simultaneous positive voltages, each of 20 volts magnitude, are applied to both inputs X and Y, the emitter is at +10 volts. Further, so long as either input X or Y or both are at ground potential, one or both of diodes 16 and 18 will conduct and maintain the base at ground potential. Only when both inputs X and Y are at +20 volts will the base be at this potential. The above conditions are tabulated for convenience in the following table (assuming that no emitter current flows), and it is readily seen from this that only for inputs applied individually to inputs X and Y will the transistor conduct and thus produce a positive output at terminal P if the transistor is non-conducting for emitter-to-base bias of −3⅓ volts or more and conducting when this bias is reduced.

| Signals in | Emitter voltage, v. | Base voltage, v. | Transistor status |
|---|---|---|---|
| (1) None | −3⅓ | 0 | Off. |
| (2) X alone | +3⅓ | 0 | On. |
| (3) Y alone | +3⅓ | 0 | On. |
| (4) X and Y | +10 | +20 | Off. |

Actually, of course, emitter current does flow when the transistor is "on" or conducting, and the emitter is then at a potential a few tenths of a volt above the base potential instead of +3⅓ volts as shown in the above table.

In one particular embodiment of the circuit of Fig. 1 with the supply potentials as shown, with the resistor 12 equal to 20,000 ohms and resistors R, R′ and 14 each equal to 10,000 ohms, the collector of the transistor was at −20 volts in its "off" condition and at −1 volt in its "on" condition, thus producing positive pulses of 19 volts magnitude in response to input pulses of 20 volts magnitude.

Referring now to Fig. 3, there is shown here a similar circuit in which the transistor 10 is replaced by a triode vacuum tube 20. The remainder of the circuit is similar to that of Fig. 1, and hence its description will not be repeated in detail, similar components having been similarly numbered. The major difference between the circuits of Figs. 1 and 3 (in addition, of course, to the replacement of the transistor 10 by tube 20 and a suitable increase of the battery voltages) is that a negative output is produced in response to positive input voltages, as indicated in Fig. 4. The following table shows again the conditions at the various tube electrodes for inputs of +60 volts similar to those of +20 volts assumed above in connection with Figs. 1 and 2, again assuming that no grid current flows when the tube is "on" or conducting and utilizing simple network analysis to derive the grid voltage values, and assuming further that the tube is cut off for a grid-to-cathode bias of −10 volts or more and conducting when this bias is reduced.

| Signals in | Grid voltage, v. | Cathode voltage, v. | Tube status |
|---|---|---|---|
| (1) None | −10 | 0 | Off. |
| (2) X alone | +10 | 0 | On. |
| (3) Y alone | +10 | 0 | On. |
| (4) X and Y | +30 | +60 | Off. |

Actually, of course, grid current will flow when the tube is ON or conducting, and the potential of the grid at this time will therefore be a fraction of a volt above cathode potential instead of +10 volts as shown in the above table.

There thus has been disclosed and described a simple, inexpensive electronic circuit which utilizes a single electronic translating device, which may take the form of either a tube or a transistor, in a logical circuit of the "Exclusive Or" type satisfying the symbolic logic equation $(x+y)\cdot(\overline{x\cdot y})$.

Note that in the embodiments disclosed, the "or" function of this equation is performed by a resistor mixing circuit, and the "and" function is performed by a diode coincidence circuit. This is particularly advantageous, because the losses occurring in the mixing circuit at coincidence, i. e., when inputs $x$ and $y$ are simultaneously present, are large enough so that the signal output from the diode coincidence circuit is sufficient to maintain the associated transistor or tube in its non-conducting or cut-off state. Note also that the signal input magnitudes and the bias voltages for the tube or transistor are chosen and related such that the tube or transistor is either (*a*) cut off, or (*b*) conducting, depending upon the input(s) applied, as set forth in the above tables.

Note, further, that the tube or transistor functions as a combined "and" logical circuit and an inversion means for the output from the "and" logical circuit including diodes 16 and 18. This is indicated in Fig. 5, which shows the circuits of Figs. 1 and 3 in block diagram form.

While only two inputs have been shown for each embodiment, more may be utilized to form an *n*-way anti-coincidence circuit, each input requiring, of course, an additional respective resistor R′ and diode, similar to diodes 16 and 18.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. For example, a p-type body point-contact transistor may be substituted in the circuit of Fig. 1 with suitable changes in signal input polarity and supply voltage magnitudes and polarities, or a junction transistor may be utilized. It is the intention, therefore, to be limited only as indicated by the scope of the following claims.

What is claimed is:

1. An anti-coincidence circuit comprising: a single electronic translating device having an output element and two control elements responsive respectively to inputs of opposite polarities to produce an output of given polarity, and means for applying operating potentials to said elements including a mixing circuit coupling one of said control elements to each of a plurality of input voltage sources and a coincidence circuit coupling the other control element to each of said input voltage sources, whereby an output is produced at said output element in response to an input voltage from any of said input voltage sources individually but not in response to simultaneous input voltages from more than one of said sources.

2. An "exclusive Or" logical circuit comprising: a single electronic translating device having an output element and two control elements responsive respectively to inputs of opposite polarities to produce an output of given polarity, and means for applying operating potentials to said elements including a resistor mixing circuit coupling one of said control elements to first and second input voltage sources and a diode coincidence circuit coupling the other control element to said first and second input voltage sources, whereby an output is produced at said output element in response to an input voltage from either of said input voltage sources individually but not in response to simultaneous input voltages from both sources.

3. An "exclusive Or" logical circuit comprising: a single electronic translating device having an output element and two control elements responsive respectively to inputs of opposite polarities to produce an output of given polarity; means for applying operating potentials to said elements including a first impedance connected to one of said control elements; second and third impedances coupling said one control element to first and second input voltage sources, respectively; and, first and second asymmetric devices coupling the other control element to said first and second input voltage sources, respectively; whereby an output is produced at said output element in response to an input voltage from either of said input voltage sources individually but not in response to simultaneous input voltages from both sources.

4. An "exclusive Or" logical circuit comprising: a transistor having emitter, collector, and base electrodes; means for applying operating potentials to said electrodes including a first impedance connected to said emitter electrode, a second impedance connected to said base electrode, and a third impedance connected to said collector electrode; fourth and fifth impedances coupling said emitter to first and second input voltage sources, respectively; and, first and second asymmetric devices coupling said base electrode to said first and second input voltage sources, respectively; whereby an output is produced at said collector electrode in response to an input voltage from either of said input voltage sources individually, but not in response to simultaneous input voltages from both sources.

5. An "Exclusive Or" logical circuit as in claim 4 wherein said transistor is of the point-contact type having an n-type semiconducting body, and said first and second input voltage sources provide positive input voltages.

6. An "Exclusive Or" logical circuit as in claim 5 wherein said impedances comprise resistors and said asymmetric devices comprise semiconductor diodes poled to pass current from said base electrode to the input voltage sources.

7. An "Exclusive Or" logical circuit comprising: an electronic discharge tube having anode, cathode, and control grid electrodes; means for applying operating potentials to said electrodes including a first impedance connected to said control grid electrode, a second impedance connected to said cathode electrode, and a third impedance connected to said anode electrode; fourth and fifth impedances coupling said control grid to first and second input voltage sources, respectively; and, first and second asymmetric devices coupling said cathode electrode to said first and second input voltage sources, respectively; whereby an output is produced at said anode electrode in response to an input voltage from either of said input voltage sources individually, but not in response to simultaneous input voltages from both sources.

8. An "Exclusive Or" logical circuit as in claim 7 wherein said anode and cathode electrodes are biased from a positive potential source and said control grid electrode is normally biased beyond cut-off.

9. An "Exclusive Or" logical circuit as in claim 8 wherein said impedances comprise resistors and said asymmetric devices comprise semiconductor diodes.

10. An "Exclusive Or" logical circuit as in claim 9 wherein said input voltage sources provide positive input voltages and said semiconductor diodes are poled to pass current from the cathode electrode to said input voltage sources.

References Cited in the file of this patent

UNITED STATES PATENTS

| | | |
|---|---|---|
| 2,636,133 | Hussey | Apr. 21, 1953 |
| 2,644,893 | Gehman | July 7, 1953 |
| 2,670,445 | Felker | Feb. 23, 1954 |
| 2,693,907 | Tootill | Nov. 9, 1954 |
| 2,694,521 | Newman et al. | Nov. 16, 1954 |
| 2,775,697 | Madey | Dec. 25, 1956 |

FOREIGN PATENTS

| | | |
|---|---|---|
| 696,222 | Great Britain | Aug. 26, 1953 |